Feb. 19, 1963    M. W. JOHNSON ET AL    3,077,735
VARIABLE SUPERSONIC INLET
Filed July 29, 1960    6 Sheets-Sheet 1
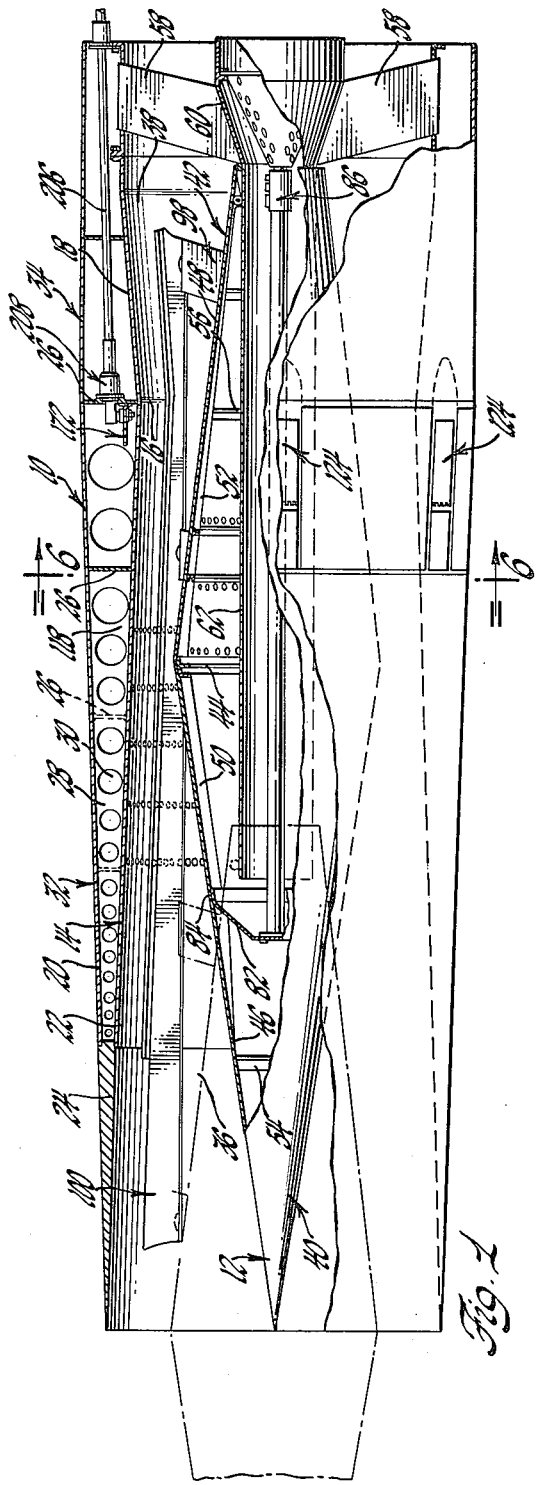
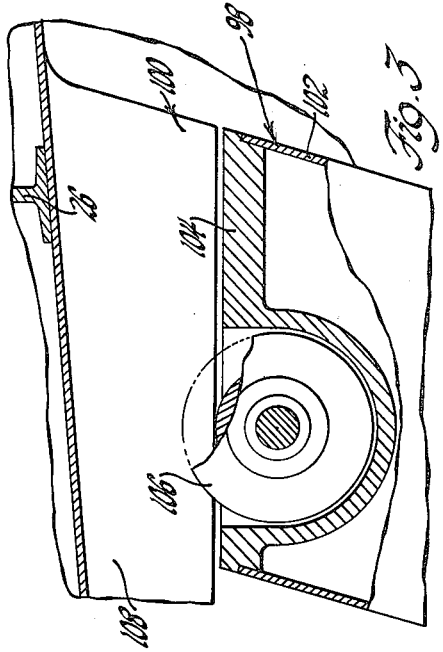
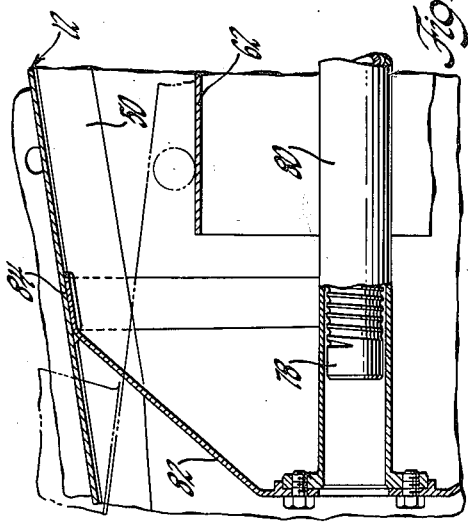
INVENTORS
Marvin W. Johnson &
BY Gerald H. Syrovy
Robert E. McCollum
ATTORNEY

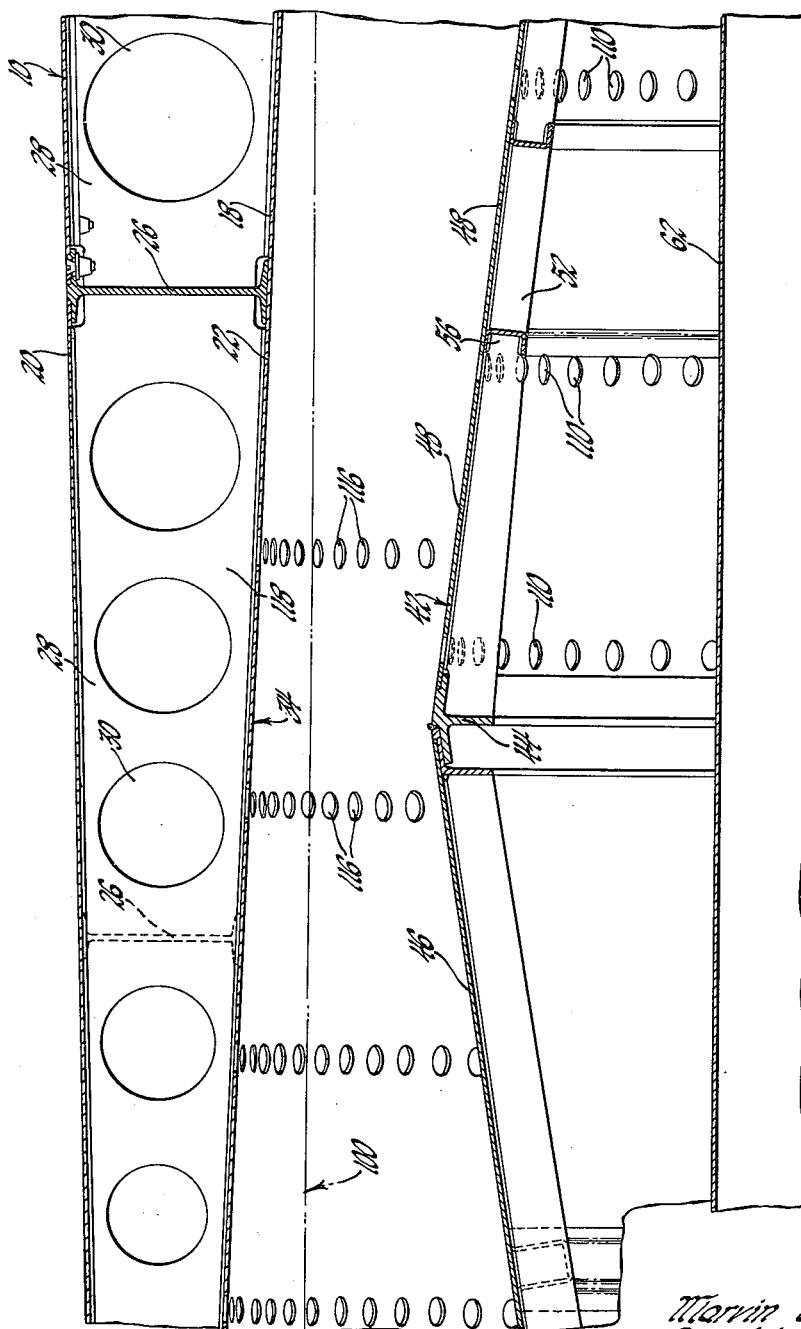

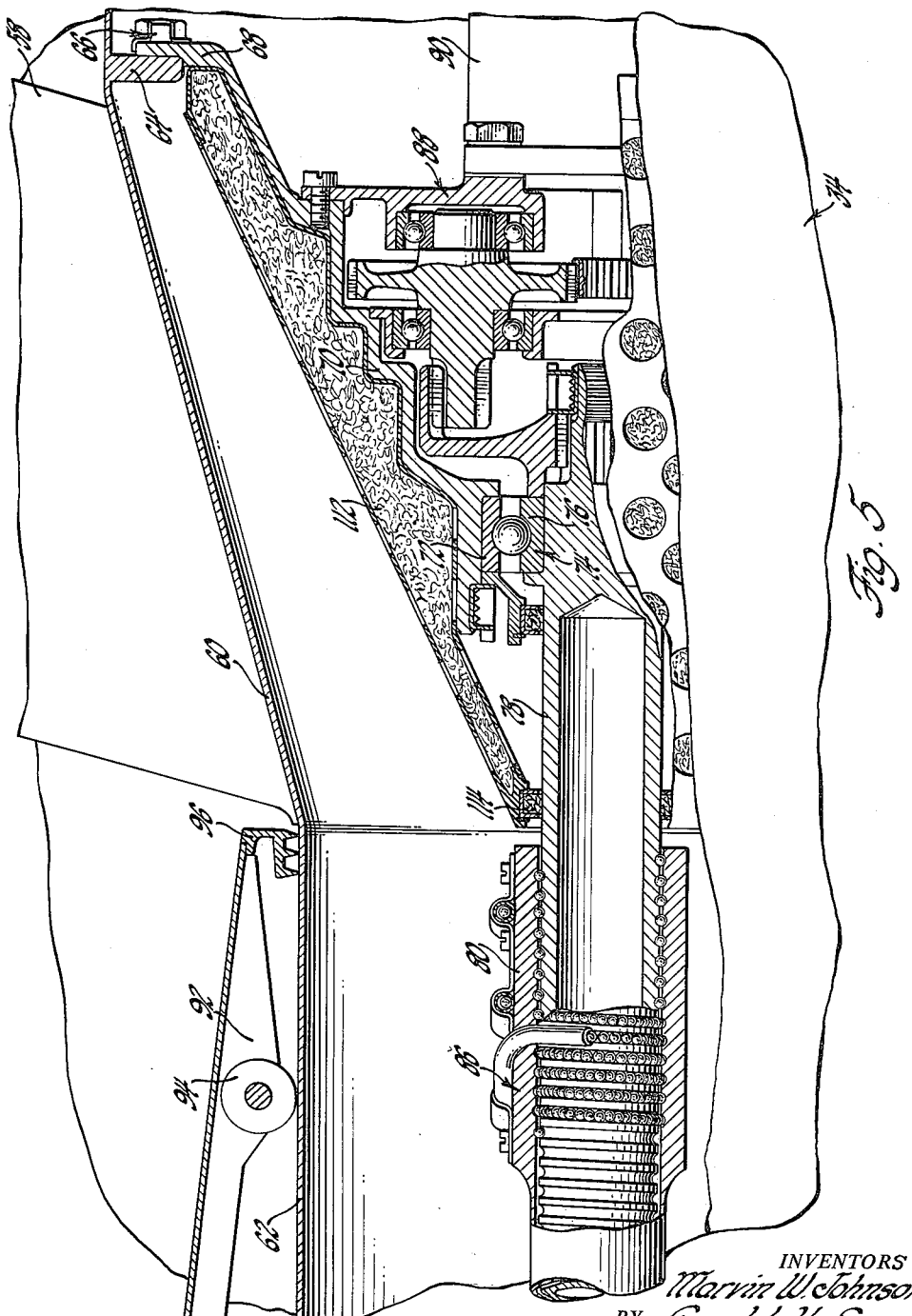

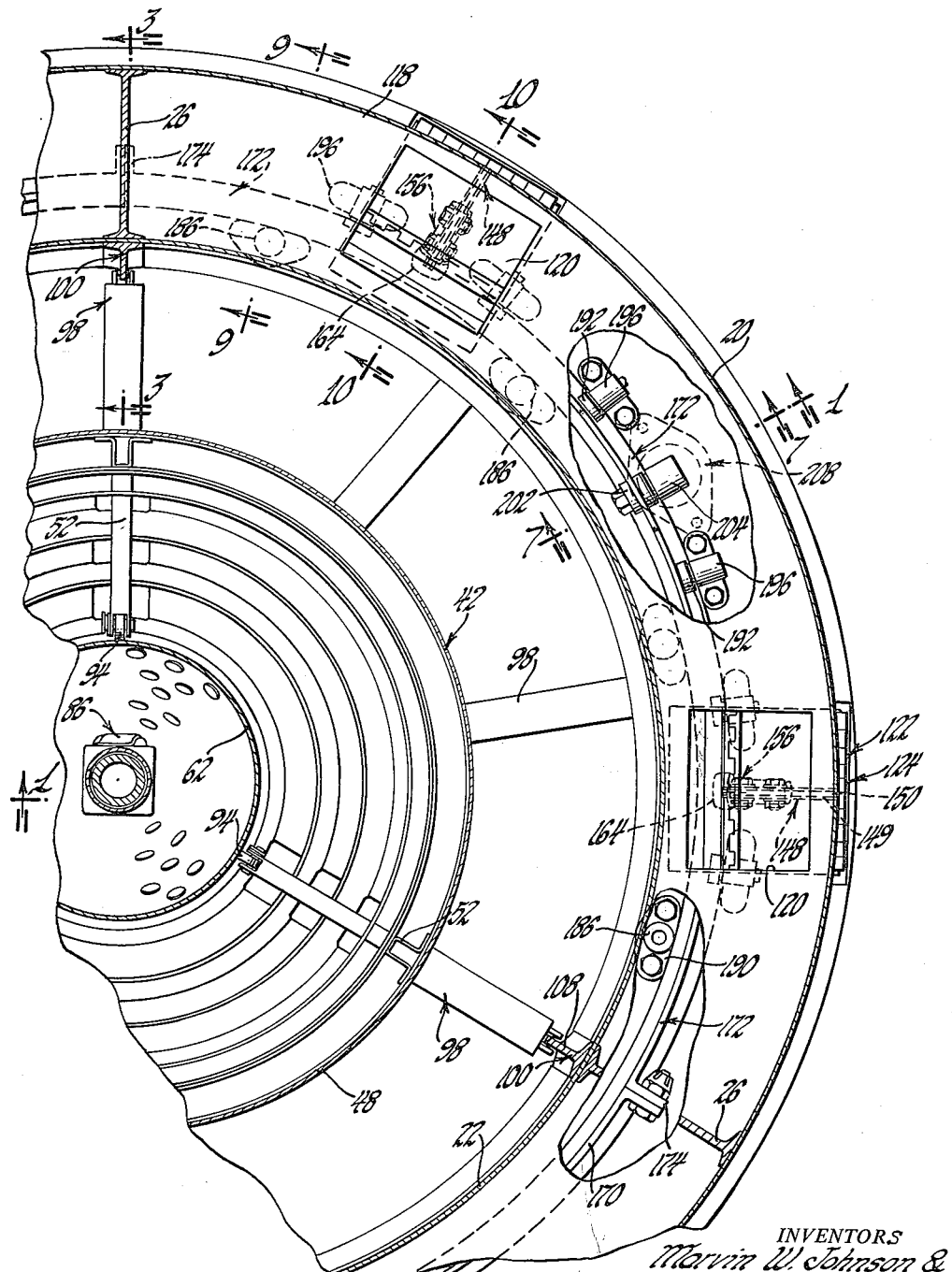

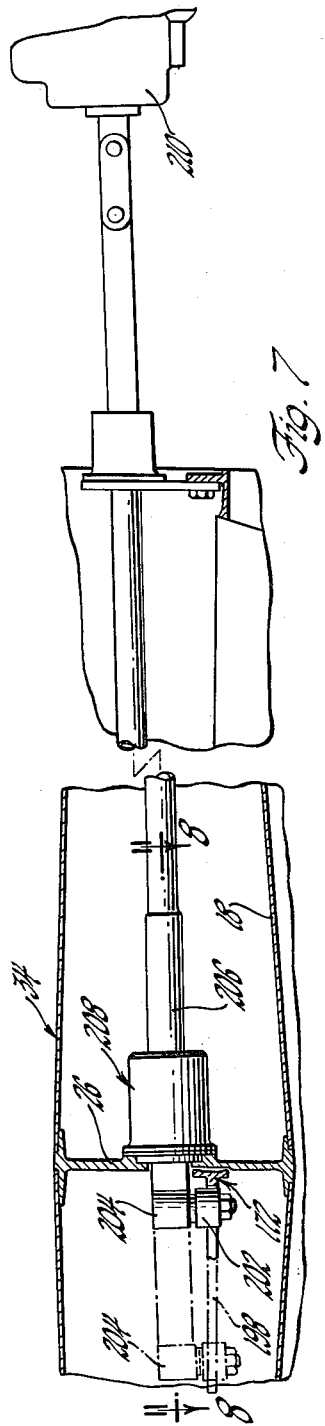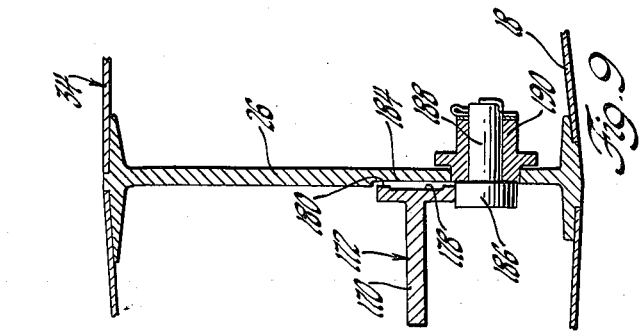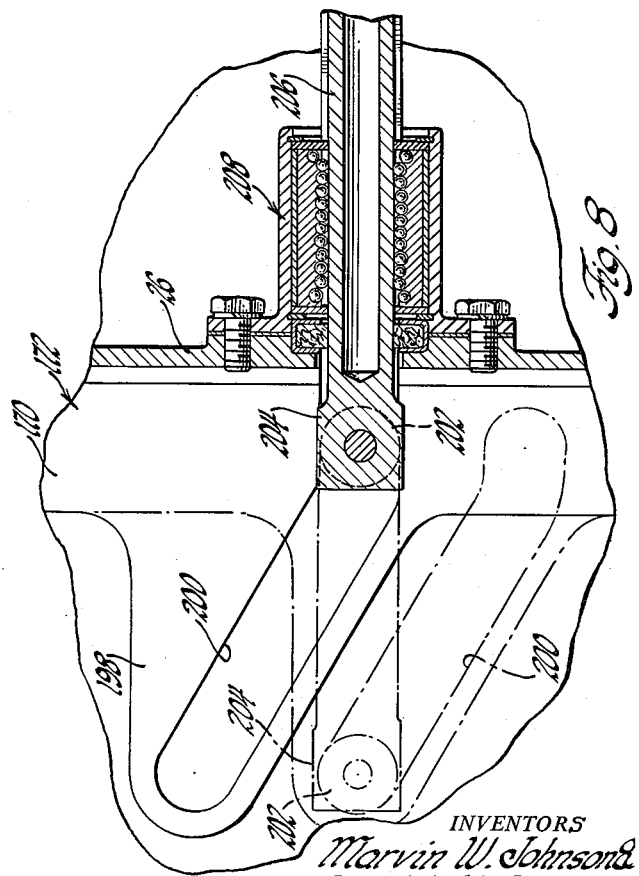

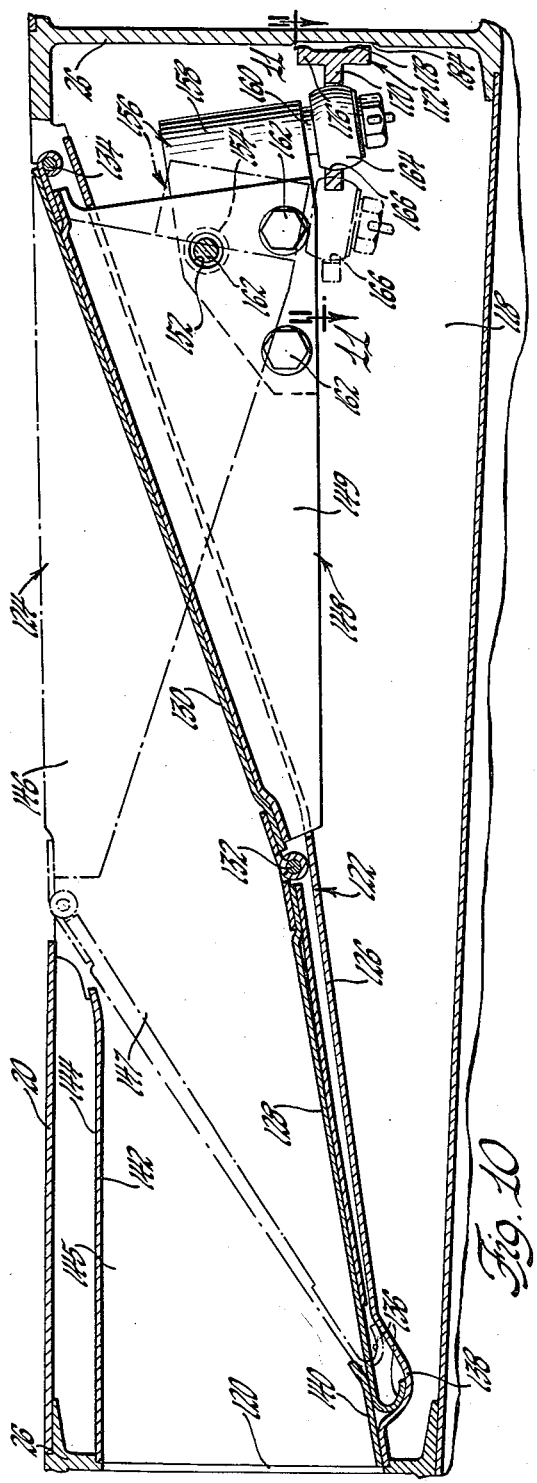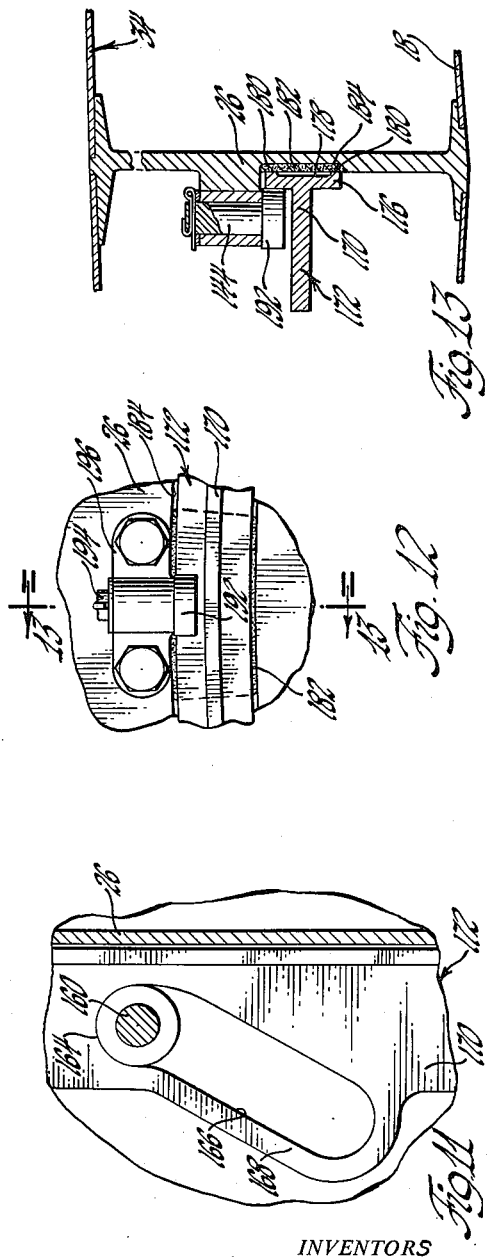

United States Patent Office 3,077,735
Patented Feb. 19, 1963

3,077,735
VARIABLE SUPERSONIC INLET
Marvin W. Johnson, Indianapolis, Ind., and Gerald H. Syrovy, Los Angeles, Calif., assignors to General Motors Corporation, Detroit, Mich., a corporation of Delaware
Filed July 29, 1960, Ser. No. 46,313
4 Claims. (Cl. 60—35.6)

This invention relates to an internal compression type gas diffuser for use in the supersonic air inlet of high Mach No. aircraft engines.

In aircraft engines having supersonic inlets, it is essential that the inlet diffuse the air in a manner to minimize the pressure recovery losses, cowl and additive drag, etc., all of which entails an inlet design such that the mass flow thereinto is at all times in the proper relationship to the throat area of the inlet to maintain the normal shock swallowed at all Mach No. flight speeds. In an inlet of the internal compression diffuser type having a stationary or non-translating central spike, additional means must usually be provided to trim the mass flow overboard during certain phases of operation of the engine to maintain the normal shock swallowed. The use of a translating spike per se or cowl bleeding with a fixed spike is in general insufficient to maintain the mass flow properly trimmed at all Mach No. flight speeds.

Therefore, this invention relates to an air-breathing type jet engine having a supersonic inlet of the internal compression diffuser type, the inlet including a translating spike cooperating with variable inlet cowl bleed means automatically operated in accordance with the change in position of the translating spike to maintain the mass flow at the throat between the spike and cowling at all times in the proper relationship to the inlet area to maintain the normal shock swallowed at all times, thereby conditioning the engine for stable operation.

Therefore, it is an object of this invention to provide an air breathing type high Mach No. jet engine with an inlet of the internal compression diffuser type having a translating spike and cowl air bleed means both operable in cooperation with each other in a manner to obtain the most efficient operation of the engine at all speeds.

Other features, objects and advantages of the invention will be apparent upon reference to the succeeding detailed description thereof, and to the drawings illustrating the preferred embodiment thereof, wherein;

FIGURE 1 is a schematic longitudinal view of one embodiment of the invention with parts broken away and in section, taken on a plane indicated by and viewed in the direction of the arrows 1—1 of FIGURE 6, FIGURES 2, 3, 4, and 5 are enlarged views of details of FIGURE 1 with parts broken away and in section, FIGURE 6 is an enlarged cross-sectional view of a portion of the FIGURE 1 construction taken on a plane indicated by and viewed in the direction of the arrows 6—6 of FIGURE 1, FIGURE 7 is an enlarged view of still another detail of FIGURE 1 taken on a plane indicated by and viewed in the direction of the arrows 7—7 of FIGURE 6, FIGURE 8 is an enlarged cross-sectional view of a portion of the FIGURE 7 construction taken on a plane indicated by and viewed in the direction of arrows 8—8 of FIGURE 7, FIGURE 9 is an enlarged cross-sectional view taken on a plane indicated by and viewed in the direction of arows 9—9 of FIGURE 6, FIGURE 10 is an enlarged cross-sectional view taken on a plane indicated by and viewed in the direction of arrows 10—10 of FIGURE 6, FIGURE 11 is a cross-sectional view taken on a plane indicated by and viewed in the direction of the arrows 11—11 of FIGURE 10, FIGURE 12 is an enlarged view of a detail of FIGURE 6, and FIGURE 13 is a cross-sectional view taken on a plane indicated by and viewed in the direction of the arrows 13—13 of FIGURE 12.

Referring to the drawings, and more particularly to FIGURE 1, there is shown schematically therein a jet engine of the air breathing type, having an internal compression type air inlet diffuser comprising an annular hollow cowl 10 cooperating with an axially translating spike 12 mounted coaxially within the cowl. The cowl has an internal taper in the downstream axial direction cooperating with the diverging conical spike to provide a converging air passage 14, a throat passage 16 of minimum area followed by a diverging air passage 18. In general, since the velocity of supersonic flow varies directly with the cross-sectional area and inversely to the pressure, the initial inlet portion converges as shown to decelerate the flow, the converging section terminating at the throat, at which point, under ideal flow conditions, the supersonic flow is changed to subsonic. Since the velocity of subsonic flow varies inversely with the cross sectional area and the pressure, the gas passage downstream of the throat is made to diverge.

Referring more specifically to the details of construction, the inlet cowl 10 consists of an outer annular sheet metal casing 20 joined to an inner annular wall 22 at the leading edge by a knife-edged apex portion 24, the casing and wall being radially spaced from each other at other positions by a number of axially spaced annular supporting members 26 connected by longitudinally extending and circumferentially spaced stiffeners 28 having lightening holes 30 therein to reduce weight. The cowl includes two longitudinally extending portions 32 and 34 joined to each other by suitable means (not shown), the forward portion 32 comprising a hollow conical section diverging in a downstream axial direction to provide the internally tapering converging gas passage 36, while the downstream portion 34 of the cowl is divergingly tapered internally in the same direction to provide the diverging gas passage 38, the outer portion of the casing 20 extending substantially axially mating with the axially extending engine casing (not shown) adapted to be secured to the downstream end of the inlet.

Cooperating with this construction is the translating spike 12 consisting essentially of two hollow sheet metal conical sections 40 and 42 having their longitudinal axes coincidental with the longitudinal axis of the cowl and being abutted in base-to-base relationship and joined at their bases by annular reinforcing and connecting members 44 T-shaped in cross-section (FIGURE 4).

Specifically, both of the conical sections 40 and 42 are substantially similarly constructed and comprise outer annular sheet metal casings 46 and 48 reinforced at circumferentially and axially spaced locations by longitudinally extending and annular stiffening members 50, 52 and 54, 56 respectively, channel shaped in cross-section.

The spike 12 is supported from the cowl 10 by three circumferentially spaced supporting struts 58 suitably connected at one end to the internal wall portion of the cowl section 34 and at their opposite ends to the bell-like end 60 of a tubular longitudinally extending shaft housing 62 adapted to both support and guide the spike in its axial translatory movement, as well as enclose the spike movement operating means to be described.

As shown more clearly in FIGURE 5, the bell-shape end 60 of housing 62 has an internal annular flange 64 to which is secured by suitable bolt means 66 the annular flange 68 of a stationary gear housing and shaft bearing support 70 secured to the outer race 72 of a bearing unit 74 having its inner race 76 suitably secured to a hollow operating shaft 78. As shown in FIGURES 1, 2 and 5, shaft 78 extends longitudinally from its supported end upstream to a position within spike portion 40. The shaft 78 is surrounded by a spike operating sleeve shaft 80 connected at its upstream end as shown by bolts or the like to the bell-shaped hollow supporting housing 82 secured by an outer annular flange to the radially outer portions 84 of the spike portion 40 and the T-shaped connecting member 44. As shown more clearly in FIGURE 5, shafts 78 and 80 are both suitably formed to receive therebetween the rotatable balls of a ball bearing advancing screw jack type mechanism 86 providing axial movement of sleeve shaft 80 upon rotation of non-translating shaft 78 to axially advance or retract the spike 12. As also seen in FIGURE 5, a reduction drive transmission 88 is drivenly engaged with shaft 78 at one end for rotation of the same upon actuation of a driving motor 90 secured to the opposite end of the transmission, the coordination and operation of which with respect to the operation of the rest of the inlet will be described later.

Each of the reinforcing channels 52 secured to section 42 of the spike is enlarged at its downstream end to provide a central guide bearing retaining portion 92 for the insertion therein of a roller 94 adapted to roll on the external surface of the housing 62 to both support and guide the downstream end of the spike 12. Secured also to the spike portion 42 at its downstream end is an annular labyrinth seal 96 for sealing the interior of the spike from the gas flow in the inlet.

The spike 12 is additionally guided and supported in its axial movement by axially spaced sets of circumferentially spaced roller assemblies 98 (FIGURE 3) cooperating with three circumferentially spaced longitudinally extending T-shaped tracks 100 (FIGURE 6), each roller assembly comprising a radially extending hollow support strut 102 secured at one end to the spike casing 46 and provided at its opposite end with a bearing retaining portion 104 rotatably receiving an annular grooved roller 106 therein, the roller engaging and straddling the web portion 108 of the track 100 during the axial movement of the spike.

The spike 12 therefore is both supported and guided by the cowl for a sliding axial movement with respect thereto by the struts 58 and roller devices 94 and 98 and is moved axially by the motor 90 acting through the gear reduction transmission 88, which can be driven by the engine directly or through the accessory drive mechanism or by other suitable means. Further details of the actual mechanism for automatically activating motor 90 to vary the position of spike 12 at different Mach Nos. are not shown since they are believed to be immaterial to an understanding of the invention, and therefore unnecessary. Suffice it to say, however, that pressure sensitive probes (not shown) are suitably positioned at the inlet and other appropriate positions to sense changes in Mach. No. flight speeds, pressure and temperature conditions, etc., to actuate a control system (not shown) automatically energizing motor 90 to operate shafts 78 and 80 through transmission 88 to axially translate the spike in accordance with engine requirements as dictated by the design conditions of the engine to variably position the spike in cooperation with cowl bleed means to be described to provide the most efficient mass flow in the inlet.

As shown more clearly in FIGURES 1, 4, and 6, provision is also made for preventing the build-up of boundary layer air on the outer surface of spike portion 42, which would interfere with the flow conditions downstream of the throat by increasing the drag, changing the gas flow area, and even disrupting the flow by creating turbulence if permitted to build up to a sufficient thickness. This relief consists of providing the outer casing of the spike portion 42 with a number of axially spaced sets of circumferentially spaced holes 110 for the bleeding the boundary layer air into the interior of the spike, thus preventing any build up thereof. This air bled into the spike interior passes into the interior of the hollow housing 62 and longitudinally therealong past the bell shaped end 60 (FIGURE 5), and is dumped overboard of the engine by any suitable means (not shown). To protect the transmission mechanism, etc., from the heat of this bleed air, a suitable insulating shield 112 is secured to the stationary support 66 at one end, and is provided with a rotating seal contact member 114 at its opposite end.

As mentioned previously, this invention contemplates the use of cowl air bleed means to trim the gas mass flow in the inlet in varying amounts in accordance with the position of the spike 12 to maintain the normal shock swallowed and the engine operating under slightly "super critical" conditions, which is a more stable condition than operating at empirical "critical" operation. The cowl bleed also removes the boundary layer build-up on cowl portion 34 and assists in starting.

Accordingly, the internally tapered portion of the cowl casing 22 is provided with a number of axially spaced sets of circumferentially spaced holes 116 connecting with air chambers 118 in the cowl defined by the spaces between reinforcing ribs 26, the ribs 26 also having a number of rectangular doors or openings 120 (FIGURES 6 and 10), six in this instance for example, permitting the flow of bleed air downstream past six variably movable flap valves 122 and overboard of the engine through six circumferentially spaced openings 124 in the outer cowl casing 20.

As seen more clearly in FIGURE 10, each of the six valves 122 controlling the dumping of cowl bleed air overboard includes a stationary supporting plate 126 extending between adjacent members 26, and is secured at opposite ends thereto to form a base gas seal plate for two flat sheet metal rectangular members 128 and 130 constituting the flap valve, the plates being placed end to end and hinged to each other by a piano type hinge 132, plate 130 being pivotally secured by another piano type hinge 134 to one supporting strut 26, while plate 128 at its opposite end is rolled at 136 for a pivotal-sliding connection with a trough formed part 138 of the base plate 126 having a retaining plate 140 secured thereto. As shown, the outer cowl casing 20 between the supporting ribs is slotted to provide the door opening 124 of a size substantially equal to the size of plate 130, the unslotted portion of the casing between the ribs being reinforced by a plate 142 connected thereto by a web portion 144. Plate 130 therefore is adapted to act as a door in one of the extreme positions of the valve to form a streamlined continuation of the casing 20 to prevent additional skin drag, etc., when bleed is not desired. With the construction as described, the plate 142 in cooperation with the valve plates 128 and 130 form therebetween a variably converging gas section 145 joined to a variably diverging gas section 146 with a throat section 147 therebetween. The two plates 128 and 130 of each valve are adapted to be pivoted about their fixed hinge points by means to be described to arcuately move the plates from the maximum open position shown in full lines radially outwardly to the maximum closed position shown in dotted or phantom lines to variably open or completely close the opening 124. Therefore, the valves in effect constitute variable area convergent-divergent air bleed nozzles, permitting the extraction of energy from the bleed air therefore adding to the over-all efficiency of the engine. The throat area of each of the nozzles is varied from a maximum to substantially zero to vary the bleed of air overboard.

In general, each of the six flap valves is adapted to be actuated to its several positions by a cam, cam follower and cam track mechanism to be described, consisting essentially of a rotatable ring actuated circumferentially upon longitudinal movement of a power actuated cam to axially cam and arcuately move the flap valve plates 128 and 130 about their pivots to variably control the area of opening 124 through which air may bleed from holes 116 and 120.

More specifically, as seen in FIGURES 6 and 10, a gusset 148 of substantially triangular shape is secured to the under side of each of the plates 130 and consists of two thin sheet metal plates 149 separated by a spacer 150, each plate having a number of holes 152 aligned with a similar number of enlarged holes 154 in a bearing retainer member 156 for the insertion of bolts 162 therein to secure the gusset and retaining member together, the enlarged holes permitting adjustment therebetween. Retaining member 156 consists of a folded over sheet metal plate provided with an end bore portion 158 fixedly retaining a bearing spindle 160 therein. Bearing spindle 160 has a spherical-like roller 164 rotatably mounted thereon constituting a cam follower slideably and rotatably projecting into a combined axially and circumferentially extending cam track slot 166. Slot 166 is cut in local enlarged areas 168 of the web portion 170 of a circumferentially extending T-shaped drive ring 172 rotatably secured to the supporting reinforcing rib 26 in a manner to be described.

As seen more clearly in FIGS. 6–13, the drive ring 172 comprises three arcuate T-shaped segments joined to each other at their adjacent flanged ends 174 as seen in FIGURE 6. The base 176 of the T of the drive ring is formed with a circumferentially extending recess 178 as shown in FIG. 13 to provide two radially spaced bearing surfaces 180 adapted to abut a number of circumferentially spaced graphite wear pads 182 secured in a circumferentially extending recess 184 in rib 26, the pads providing bearing surfaces for the rotating movement of the drive ring. As seen in FIGURE 9, the drive ring is supported vertically for a rotative movement by a number of circumferentially spaced radial guide rollers 186 each rotatably mounted on a spindle 188 journaled in a flanged mounting boss 190 secured to rib 26. The drive ring is maintained axially in contact with the graphite pads 182 by other circumferentially spaced rollers 192 (FIGURES 12 and 13) each having spindles 194 rotatably journaled in a flanged boss 196 secured to the rib 26.

The drive ring is adapted to be rotated or driven by the mechanism shown in FIGURES 7 and 8, the drive ring having a locally enlarged area 198 having a combined circumferentially and axially extending cam track 200 cut therein and receiving a drive roller 202 rotatably secured in the bearing retaining end 204 of a hollow longitudinally extending shaft 206 reciprocally mounted on a ball bearing support 208 secured to the reinforcing rib 26, the shaft 206 extending downstream for connection with any suitable actuating mechanism, such as an electric motor 210.

Motor 210 causes an axial movement of shaft 206 from the position indicated in full lines in FIG. 8 to that indicated by dotted lines or vice-versa to circumferentially drive the drive ring 172, the amount of circumferential rotation and direction depending upon the desired amount of opening or closing of each of the openings 124 by the valves 122. Circumferential rotation of drive ring 172 therefore moves the cam tracks 166 circumferentially to axially move and pivot the spherical like rollers 164 pivoting valve plates 128 and 130 about the pivots 132, 134 and 136 to arcuately move the valves in this particular instance to the dotted line position in FIGURE 10, thereby closing each of the valves to prevent any further dumping of air from the inlet. If it is desired to bleed air, the motor 210 is actuated to move the drive ring in the opposite direction to thereby open the valves to any degree desired.

Having described the operation of the several elements per se, a brief description of the general operation is as follows:

Under normal engine running conditions, the spike 12 will have a predetermined relative position with respect to the cowling 10 to provide a converging inlet gas passage 14, a throat 16 and a diverging passage 18. Whether or not the cowl bleed valves 122 open at this time will depend upon the particular Mach No. flight speed attained. Assuming that the cowl valves are closed, upon sufficient increase in the Mach No. flight speed requiring a movement of the spike as well as the need for bleeding mass flow from the inlet to maintain the normal shock wave slightly downstream of the throat section 16, the sensing probes for both the spike and cowl flap valves will signal for an actuation of both the spike and valves to trim the mass flow as well as change the throat area between the spike and cowl by axially moving the spike. The spike probe sensor therefore actuates the spike actuating motor mechanism 90 to rotate drive shaft 78 through the reduction transmission 88 to axially advance or retract the sleeve shaft 80 and thus the spike 12 through the advancing screw assembly 86 to vary the radial distance between the spike and the cowl at the throat section 16. Simultaneously, or as required, the probe (not shown) sensing a need for cowl bleeding causes energization of motor 210 to reciprocate shaft 206 circumferentially rotating drive ring 172 to thus variably open or close the flap valves 122 to increase or decrease the air flow through the openings 120 and 124.

It will be seen therefore that this invention provides automatically operated means to automatically adjust the position of the traveling spike as well as the cowl bleed means to maintain the correct mass flow in the inlet at all times to produce the most efficient operation thereof.

While the invention has been described in general terms with reference to the number of bleed openings, etc., an illustrative design might include for instance, 6 spike bearings, 425 supersonic flow bleed openings in the cowl providing a 4% bleed of supersonic flow; six bleed valves having a maximum throat area equal to 50% of the supersonic flow inlet area openings 120; 135 holes for spike boundary layer bleed providing a 4% bleed of the subsonic flow through the throat area; the cowl bleed actuating drive ring having 14 graphite wear pads engaged by a similar number of drive ring guide and support rollers; the planetary gearing ratio of the reduction drive transmission 88 for actuation spike 12 being 22.40 to 1; the spike travel being 45 inches within an inlet having a maximum 22.5 inch diameter.

While the invention has been shown in its preferred embodiment, it will be clear to those skilled in the arts to which this invention pertains that many modifications may be made thereto without departing from the scope of the invention.

We claim:

1. A variable area turbomachine gas inlet including a longitudinally extending internally tapering hollow annular cowling, a longitudinally extending spike of conical-like shape positioned radially therefrom therewithin, support means secured to both said cowling and said spike for supporting said spike for a slideable axial movement with respect to said cowling, the area between said cowling and spike together defining a gas inlet area converging in a downstream axial direction, means to axially slide said spike to vary the said gas area therebetween, and cowl bleed means for bleeding some of the gas in said inlet overboard with respect to said turbomachine, said cowling having a plurality of apertures in both internal and external surfaces thereof, and gas valve means moveably secured in said cowl between said apertures and variably moveable between open and closed positions in cooperation with the movement of said spike for variably controlling the bleed of gas therethrough to control the mass flow of gas through said inlet in accordance with the position of said spike, said valve means consisting of a plurality of end-to-end members pivotally hinged to each other at one end and to a stationary portion of the cowling at their opposite ends and pivotally moveable between positions to variably open or block the cowling bleed apertures.

2. A variable area inlet as in claim 1 wherein means are provided for the variable pivotal movement of said flap valve, said means including engaged cam follower and cam track means secured to said cowling and valve, and means to move said cam track.

3. A supersonic fluid inlet comprising a longitudinally extending annular cowling having an outer wall and a longitudinally tapering inner wall defining a fluid duct of varying area open at opposite ends, a fluid bleed passage extending through and connecting said walls for bleeding fluid outboard of said inlet, said passage having converging and diverging wall portions constructed and arranged to define a convergent-divergent fluid jet exhaust nozzle to extract energy from the fluid bled, some of said wall portions being movable to vary the area of said passage, said movable wall portions comprising two longitudinally extending flat plates hinged together at one end and each hingedly connected at its opposite end to a different wall of said cowling, and means variably moving one of said plates across said passage to variably block the flow of fluid through said passage.

4. A supersonic fluid inlet comprising a longitudinally extending annular cowling having an outer wall and a longitudinally tapering inner wall defining a fluid duct of varying area open at opposite ends, a plurality of bleed passages spaced circumferentially around said cowling extending through and connecting said walls for bleeding fluid outboard of said inlet, each of said passages having converging and diverging wall portions constructed and arranged to define a convergent-divergent fluid jet exhaust nozzle to extract energy from the fluid bled, some of said wall portions of each passage being movable to vary the area of the passage, and actuating means to move the movable wall portions to variably control the flow of fluid through said passage, said actuating means including an annular ring rotatably mounted on said cowling and having a plurality of cam tracks, a cam follower secured to each of said movable passage wall portions and mounted in one of said cam tracks, movement of said cam tracks simultaneously moving all of said movable wall portions to variably control the flow of fluid through said bleed passages.

References Cited in the file of this patent
UNITED STATES PATENTS

| | | |
|---|---|---|
| 2,861,419 | Hausmann | Nov. 25, 1958 |
| 2,934,893 | Streeter | May 3, 1960 |
| 2,939,276 | Wise | June 7, 1960 |

FOREIGN PATENTS

| | | |
|---|---|---|
| 747,705 | Great Britain | Apr. 11, 1956 |
| 1,075,248 | France | Apr. 14, 1954 |

OTHER REFERENCES

Stack: "Engine Intake Controls," Flight Magazine, volume 72, No. 2553, pages 1000–1002, Dec. 27, 1957.